UNITED STATES PATENT OFFICE.

WILLIAM E. FARRELL, OF PHILADELPHIA, PENNSYLVANIA.

IMPROVEMENT IN THE MANUFACTURE OF PAPER AND PAPER-PULP.

Specification forming part of Letters Patent No. 208,518, dated October 1, 1878; application filed July 15, 1878.

*To all whom it may concern:*

Be it known that I, WILLIAM E. FARRELL, of the city and county of Philadelphia, State of Pennsylvania, have invented certain new and useful Improvements in Paper and Paper-Pulp made from the salt-water plant the botanical name of which is *Juncus Gerardi*, of which the following is a specification:

The nature of my invention will be fully set forth in the following specification and claims.

This plant grows on marshes near the sea, or on low lands which are subjected to the action of salt-water tides. It is found occasionally in small quantities on the coast of New England, but more abundantly on the coast of New Jersey, and farther south.

To enable others skilled in the art to use my invention, I will describe one of many processes by which I obtain my results.

I use the plant *Juncus Gerardi* in any stage of its growth, but preferably when it has arrived at full maturity, as it then has more fiber and less gum, acids, and other deleterious matter contained in it, and, being fully ripe, the seed-pods burst open, and the seeds, falling to the ground, insure a crop for the next season, and also because the seeds are thus got rid of, as they are hard to subdue in the subsequent treatment of the plant for paper-pulp, and their presence in the pulp is to be avoided.

I place the plant *Juncus Gerardi* in any open or closed vessel suitable for a boiler, but prefer the rotary boiler commonly used in paper-mills, because, being closed in, it takes less steam, time, and chemicals to obtain the best results, and turning over the fibers in the rotary boiler causes a more thorough circulation of the chemicals held in solution. I then add water in which sufficient lime, soda-ash, or other alkalies (preferably lime, on account of its low cost) are held in suspension, apply steam, and boil (if in a closed vessel) under a pressure which will vary in duration and amount according to the quality of paper-pulp desired and the age at which the plant has been gathered. When boiled enough in the lime or other alkalies and water, the water is allowed to run away, carrying with it the chemicals and the intercellular matter contained in the plant. The remaining fibers are then well washed to remove the impurities still remaining, after which they are beaten to paper-pulp in the usual paper-pulping engines, according to the quality of the paper desired. The pulp thus resulting may then be made into paper composed wholly of the fibers of the *Juncus Gerardi*, or combined in such proportions with any other fibers—such as wood, straw, or other fiber—as the quality desired may require.

I do not limit myself to this one process (which is not new) of producing paper or paper-pulp from the plant *Juncus Gerardi*. Many other processes are known to the arts, and any other economical process may be used.

It has been found in practice that the pulp made from the grass above named contains a certain proportion of the grass-seeds, which, when the pulp is made into paper, mark the latter in innumerable spots, and the paper, when manufactured from that pulp, will contain that spotted feature, which will distinguish it from paper made from other materials. Of course, manufacturers can, by processes well known to those skilled in the art for eradicating or hiding blemishes, and what some would call imperfections in the completed article, hide these spots to such a degree that they can scarcely be distinguished, and so that, to an ordinary observer, the paper will look like that manufactured from a more expensive material than the grass above named. These plans are, however, those ordinarily pursued in the manufacture of paper by paper-makers, to make paper made from an inferior stock resemble, as closely as possible, that made from so-called "superior stock."

Having thus described my invention, what I claim as new, and desire to secure by Letters Patent, is—

1. As a new article of manufacture, paper or paper-pulp composed of the fibers of the salt-water plant *Juncus Gerardi*, substantially as described.

2. As a new article of manufacture, paper or paper-pulp composed of the fibers of the salt-water plant *Juncus Gerardi* in combination with other fibers, substantially as described.

WILLIAM E. FARRELL.

Witnesses:
GEORGE E. BUCKLEY,
HENRY V. BUCKLEY.